(12) United States Patent
Jin et al.

(10) Patent No.: US 11,435,754 B2
(45) Date of Patent: Sep. 6, 2022

(54) AUTONOMOUS MOVING APPARATUS AND NON-TRANSITORY COMPUTER READABLE MEDIUM

(71) Applicant: FUJIFILM Business Innovation Corp., Tokyo (JP)

(72) Inventors: Xiongfan Jin, Kanagawa (JP); Mariko Miyazaki, Kanagawa (JP); Hideki Fujimoto, Kanagawa (JP); Tetsuya Kobayashi, Kanagawa (JP); Hajime Kajiyama, Kanagawa (JP); Kunitoshi Yamamoto, Kanagawa (JP); Teppei Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 196 days.

(21) Appl. No.: 16/681,838

(22) Filed: Nov. 13, 2019

(65) Prior Publication Data

US 2020/0159243 A1    May 21, 2020

(30) Foreign Application Priority Data

Nov. 21, 2018    (JP) .............................. JP2018-218184

(51) Int. Cl.
*G05D 1/02*    (2020.01)
*G05D 1/00*    (2006.01)
*G06V 20/56*    (2022.01)

(52) U.S. Cl.
CPC ......... *G05D 1/0246* (2013.01); *G05D 1/0088* (2013.01); *G06V 20/56* (2022.01)

(58) Field of Classification Search
CPC ............... G05D 1/0246; G05D 1/0088; G05D 2201/0216; G05D 1/12; G06V 20/56; G06V 20/10; G06V 40/10
See application file for complete search history.

(56) References Cited

U.S. PATENT DOCUMENTS

| | | | | |
|---|---|---|---|---|
| 2006/0064203 A1* | 3/2006 | Goto | ..................... | G05D 1/0246 700/245 |
| 2006/0170769 A1* | 8/2006 | Zhou | ................ | G08B 13/19613 348/143 |
| 2012/0229643 A1* | 9/2012 | Chidanand | ......... | G06K 9/00369 348/148 |
| 2014/0085465 A1* | 3/2014 | Angermann | ......... | G01C 21/206 348/143 |

FOREIGN PATENT DOCUMENTS

WO    2017056334    4/2017

* cited by examiner

*Primary Examiner* — Marthe Y Marc-Coleman
(74) *Attorney, Agent, or Firm* — JCIPRNET

(57) ABSTRACT

An autonomous moving apparatus includes: a detection unit that detects a distance to an object around the apparatus and a shape of the object; a moving unit that moves the apparatus so as to follow operation of a target person to be followed, which is detected by the detection unit; and a control unit that performs control for movement by the moving unit or stop in accordance with motion of each of two feet of the target person to be followed, which is detected by the detection unit.

11 Claims, 16 Drawing Sheets

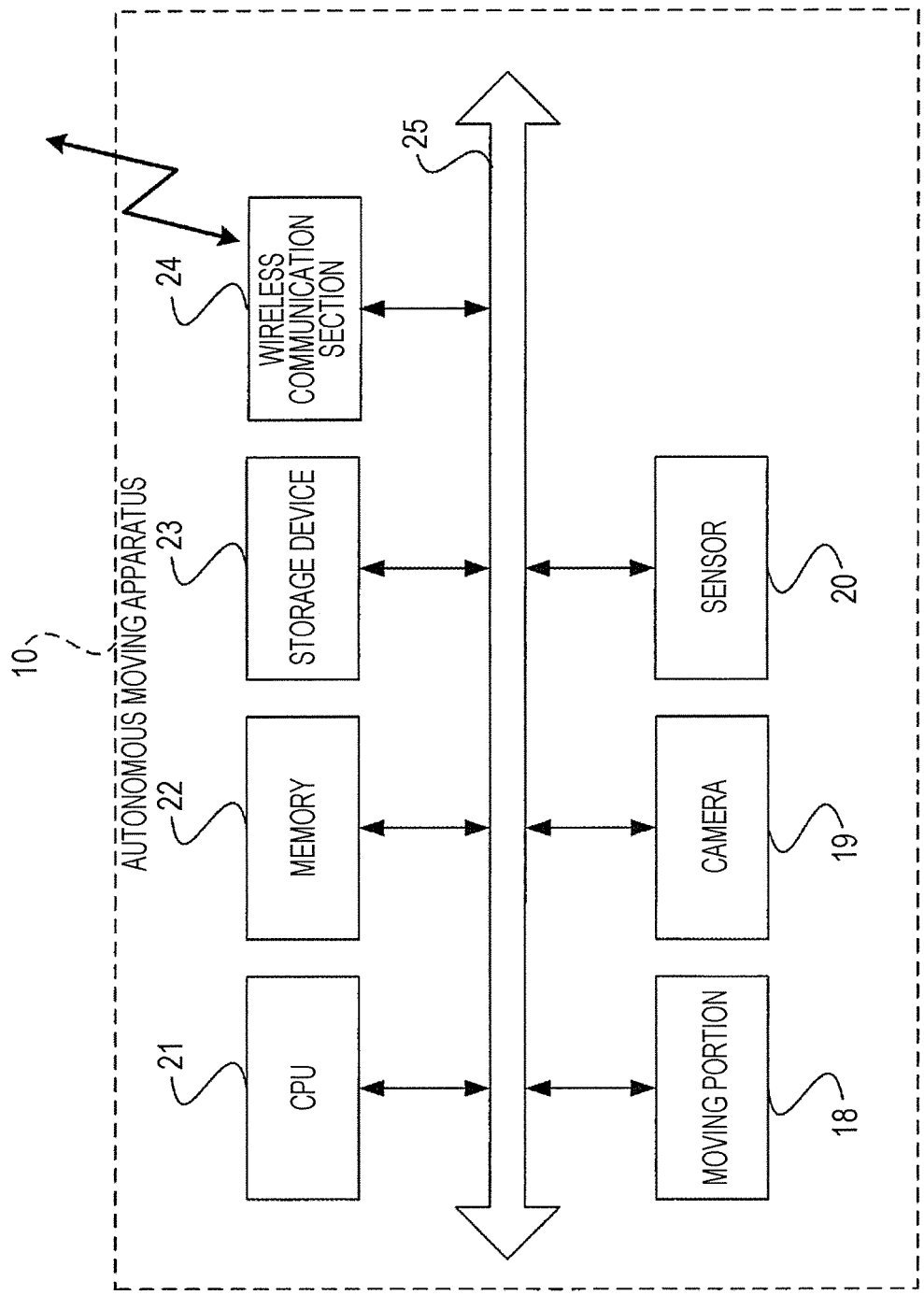

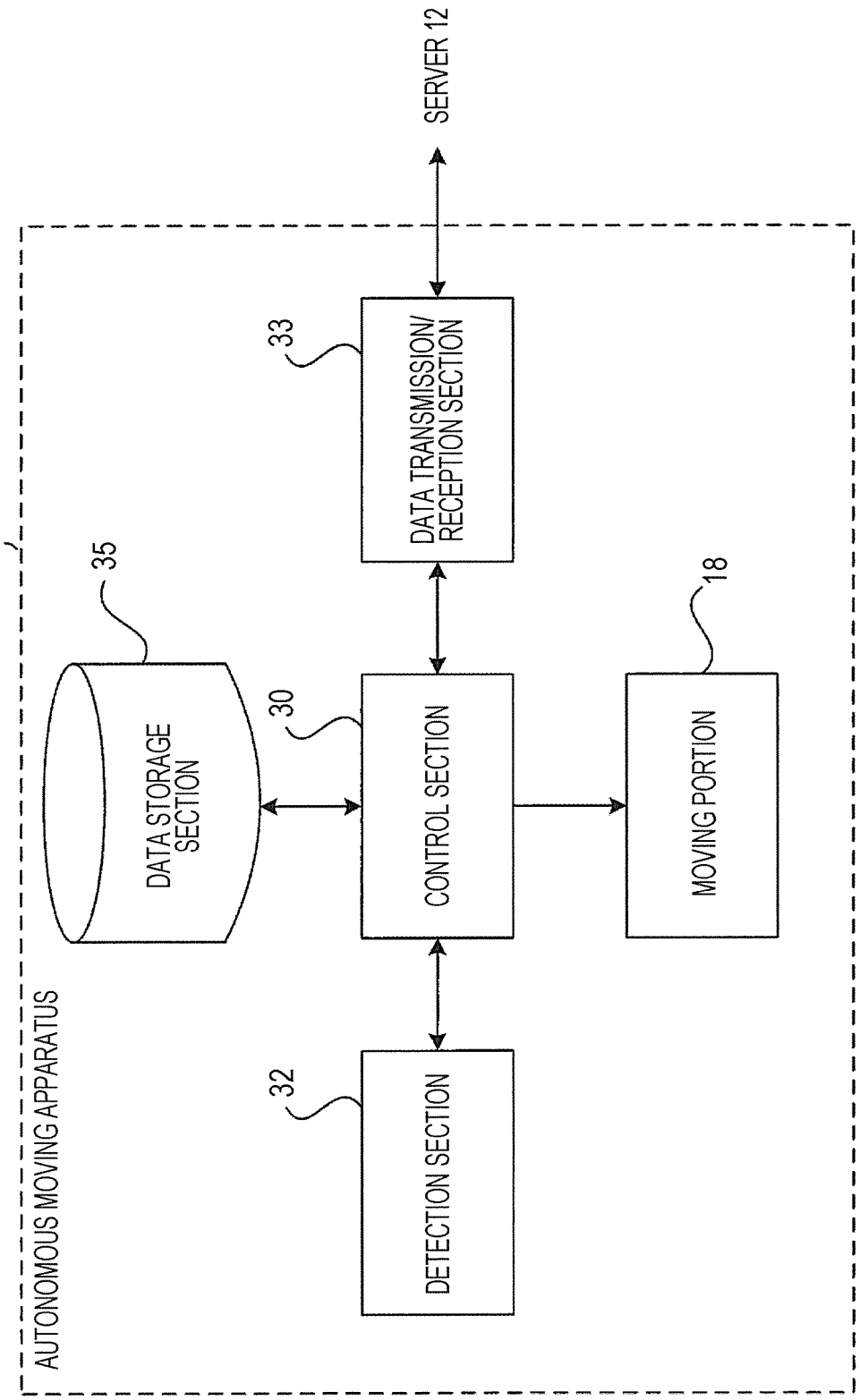

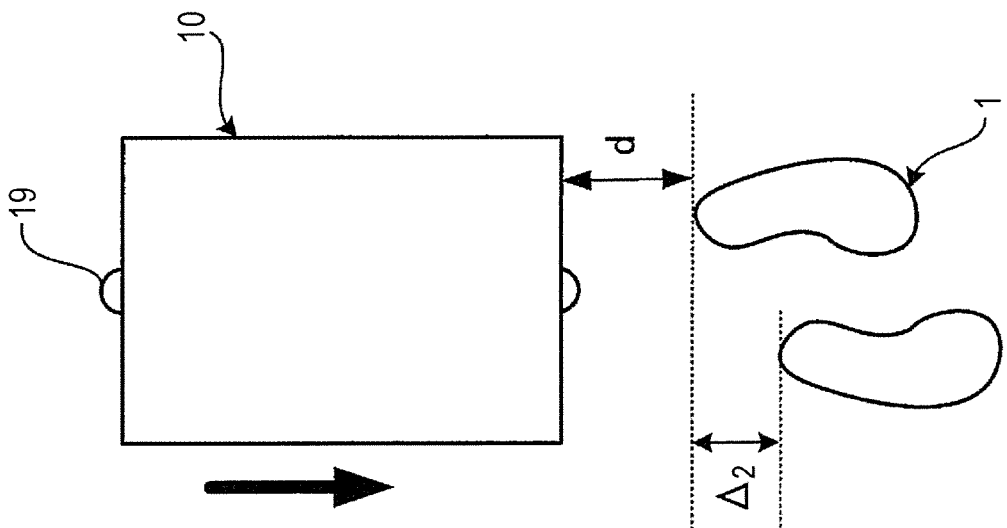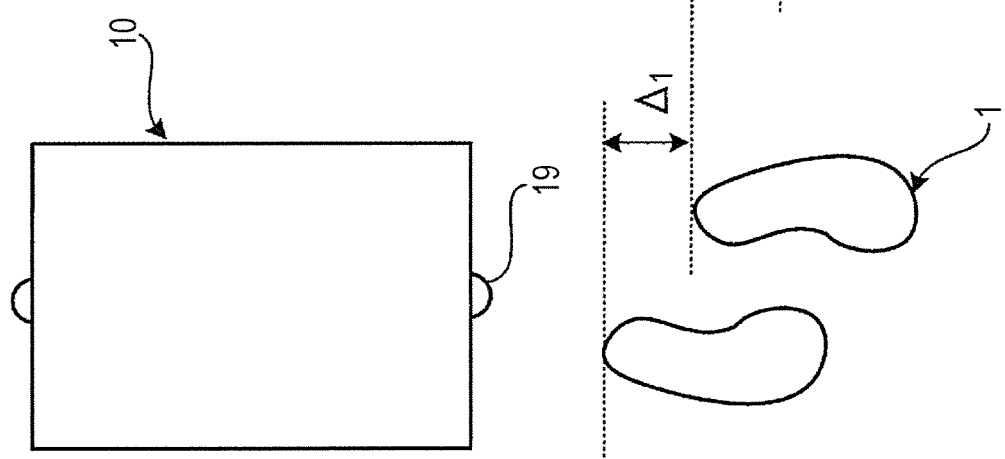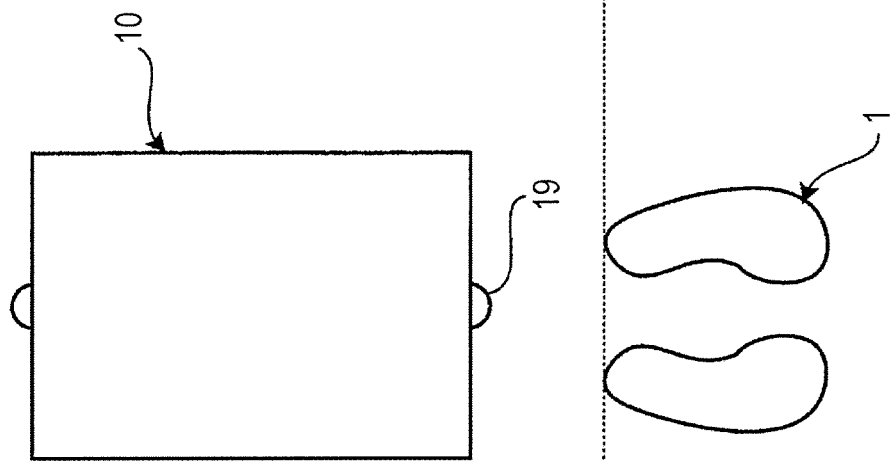

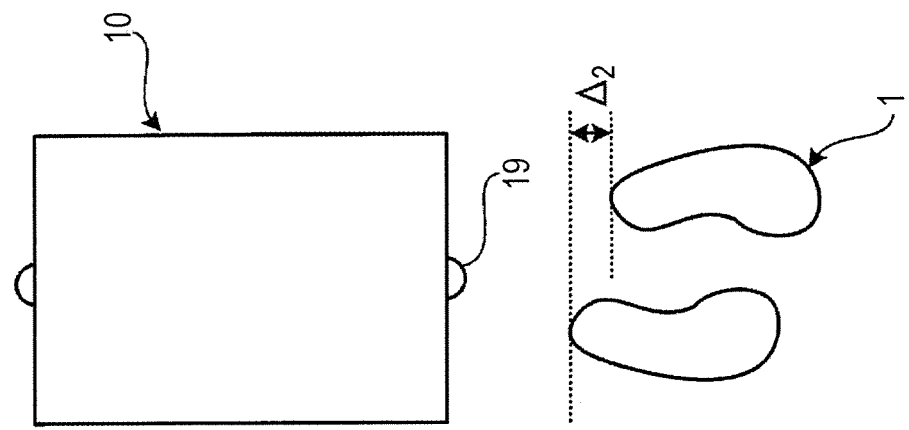
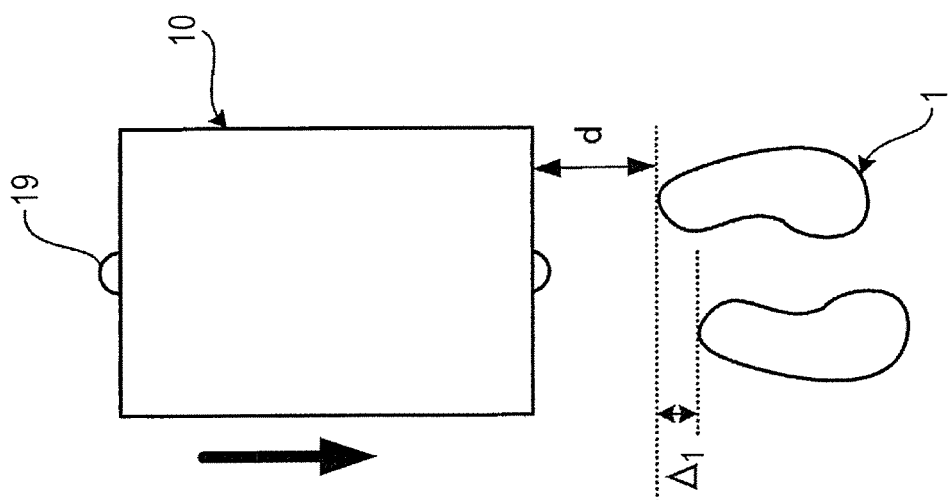
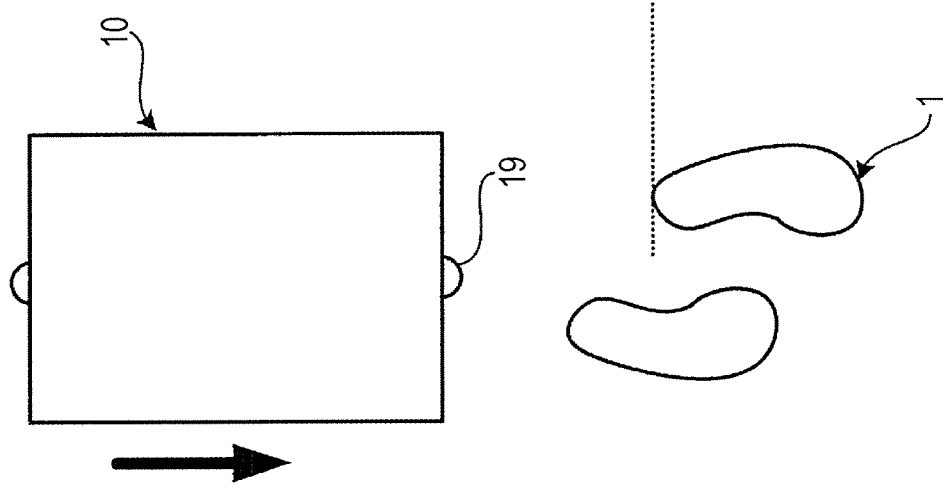

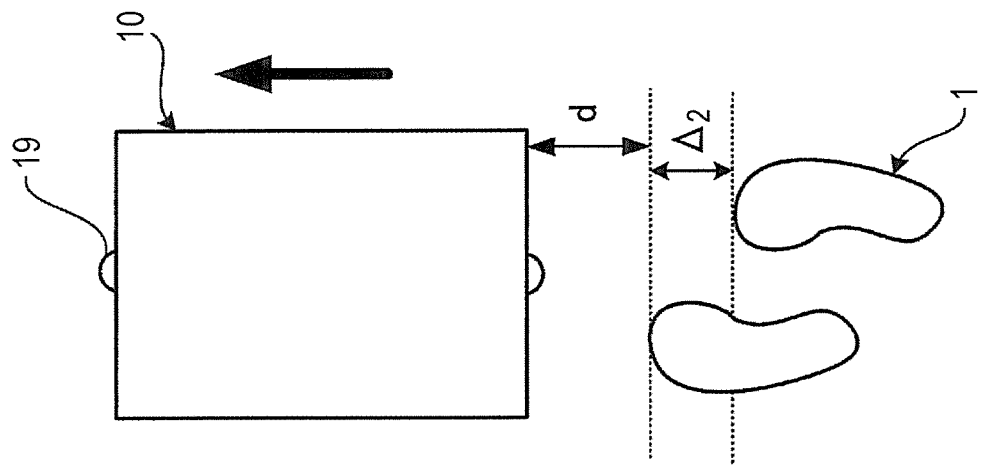
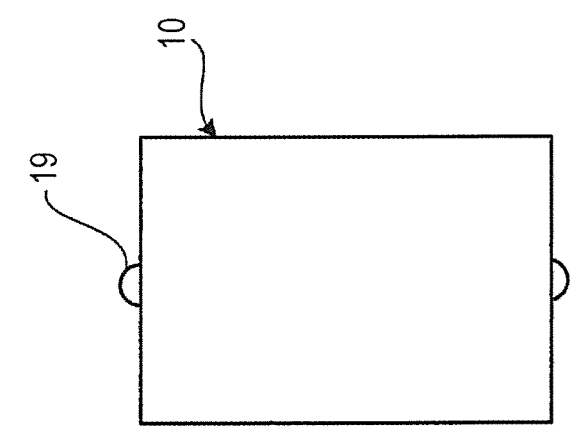
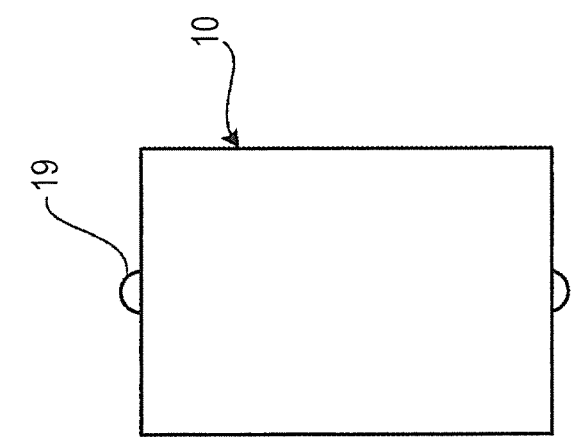

AUTONOMOUS MOVING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-218184 filed Nov. 21, 2018.

BACKGROUND

(i) Technical Field

The present disclosure relates to an autonomous moving apparatus and a non-transitory computer readable medium.

(ii) Related Art

International Publication No. 2017/056334 discloses an object following movement system in which a movable housing that includes a motor moves, the object following movement system including a lead-type input device that is operable from a position away from the movable housing through a lead with a variable or fixed length of 0.1 meter or more, and an object following function of detecting the position of an object to be followed and traveling so as to follow the object to be followed, the object following movement system carrying out starting and stopping of the object following function, changing of modes, changing of object following methods, and identification of the object to be followed using the lead-type input device.

SUMMARY

Aspects of non-limiting embodiments of the present disclosure relate to providing an autonomous moving apparatus and a non-transitory computer readable medium that are capable of reducing the possibility to execute control for movement or stop that does not match operation of a target person to be followed for movement or stop during movement to follow operation of the target person to be followed, compared to a case where control for movement or stop is performed in accordance with the distance to the target person to be followed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an autonomous moving apparatus including: a detection unit that detects a distance to an object around the apparatus and a shape of the object; a moving unit that moves the apparatus so as to follow operation of a target person to be followed, which is detected by the detection unit; and a control unit that performs control for movement by the moving unit or stop in accordance with motion of each of two feet of the target person to be followed, which is detected by the detection unit.

BRIEF DESCRIPTION OF THE DRAWINGS

An exemplary embodiment of the present disclosure will be described in detail based on the following figures, wherein:

FIG. 3 is a block diagram illustrating the hardware configuration of the autonomous moving apparatus according to the exemplary embodiment of the present disclosure;

FIG. 4 is a block diagram illustrating the functional configuration of the autonomous moving apparatus according to the exemplary embodiment of the present disclosure;

FIGS. 7A to 7C illustrate operation of the autonomous moving apparatus from the stop in the stop mode to the start of movement in the following mode illustrated in FIG. 6;

FIGS. 9A to 9C illustrate operation of the autonomous moving apparatus from the middle of movement in the following mode to the stop in the stop mode illustrated in FIG. 8;

FIGS. 14A to 14C illustrate operation of the autonomous moving apparatus from the stop in the stop mode to the start of movement in the leading mode illustrated in FIG. 13;

DETAILED DESCRIPTION

Now, an exemplary embodiment of the present disclosure will be described in detail with reference to the drawings.

Figure 1:
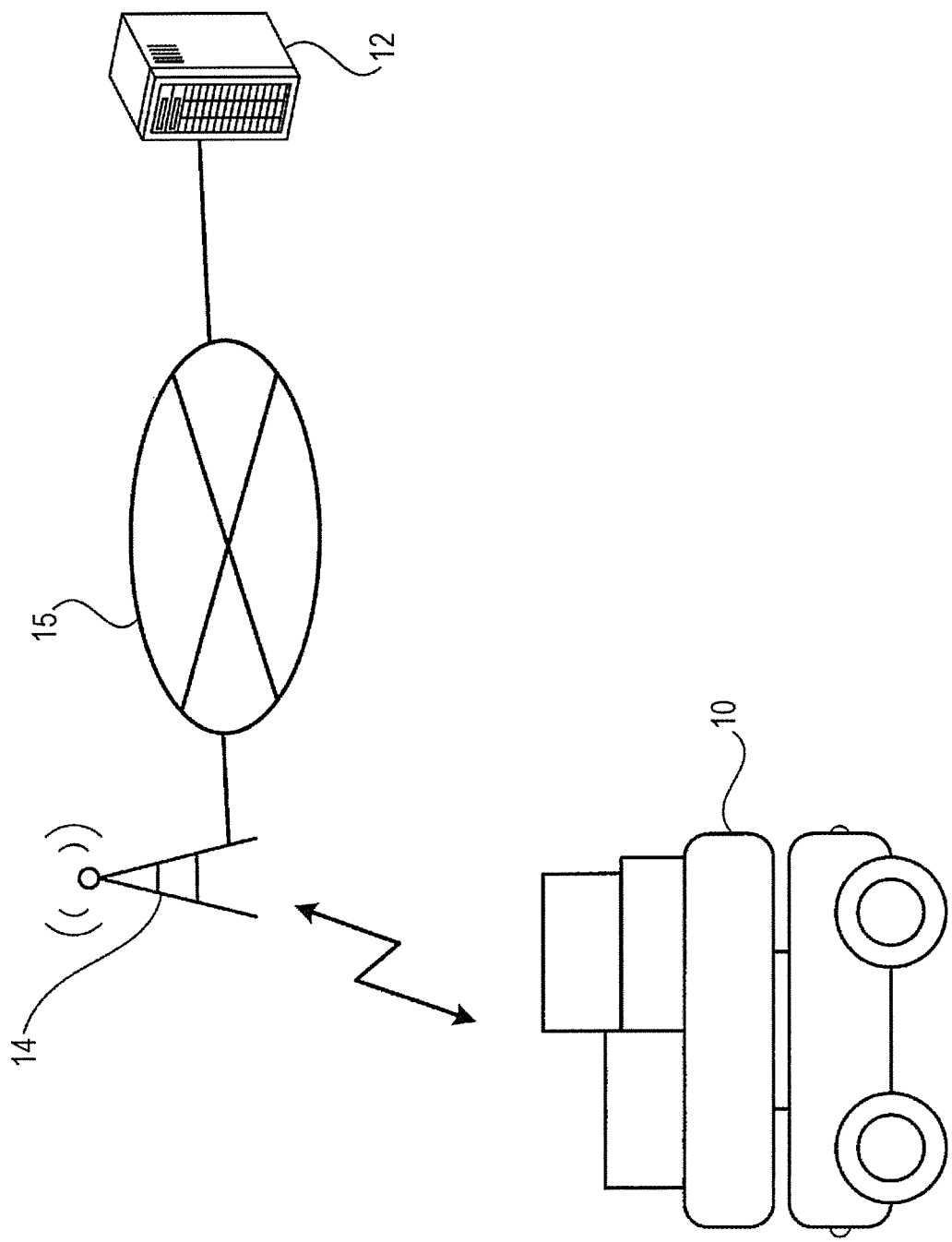
FIG. 1 illustrates the system configuration of an autonomous moving apparatus according to an exemplary embodiment of the present disclosure.

FIG. 1 illustrates the configuration of a system that uses an autonomous moving apparatus 10 according to an exemplary embodiment of the present disclosure.

As illustrated in FIG. 1, the system which uses the autonomous moving apparatus 10 according to the exemplary embodiment of the present disclosure is constituted from the autonomous moving apparatus 10 and a server 12.

The autonomous moving apparatus 10 and the server 12 are connected to each other by way of a cellular phone communication network 14 and the Internet 15, for example.

The autonomous moving apparatus 10 transmits and receives data etc. to and from the cellular phone communication network 14. In addition, the autonomous moving apparatus 10 includes a moving unit that moves the apparatus itself. The moving unit allows the autonomous moving apparatus 10 to be autonomously moved so as to follow a target person to be followed 1. The term "follow" means moving and stopping ahead of or behind the target person to be followed 1 in accordance with motion of the target person to be followed 1.

Specifically, the autonomous moving apparatus 10 is able to detect motion of a hand, a foot, etc. of the target person to be followed 1, and move or stop in accordance with one of operation modes that include a following mode in which the autonomous moving apparatus 10 moves behind the target person to be followed 1, a leading mode in which the autonomous moving apparatus 10 moves ahead of the target person to be followed 1, and a stop mode in which the autonomous moving apparatus 10 stops. The autonomous moving apparatus 10 eliminates the need for a user to perform an operation to switch among the following mode, the leading mode, and the stop mode.

In the present exemplary embodiment, the autonomous moving apparatus 10 includes a carrier portion on which a package such as a packing box is to be loaded, and moves or stops ahead of or behind the target person to be followed 1 such as a delivery person who collects and delivers a package.

Figure 2:
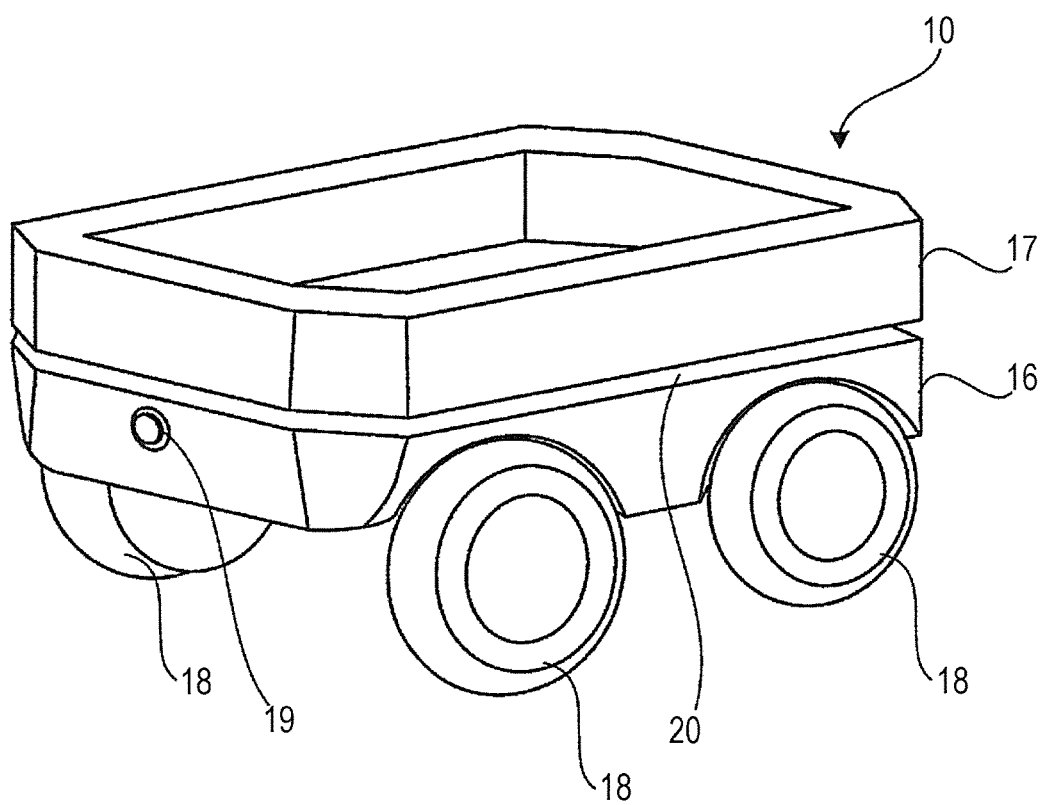
FIG. 2 is a perspective view illustrating the autonomous moving apparatus according to the exemplary embodiment of the present disclosure.

Next, the configuration of the autonomous moving apparatus 10 will be described. FIG. 2 is a perspective view illustrating the appearance of the autonomous moving apparatus 10.

The autonomous moving apparatus 10 includes an apparatus body portion 16, a carrier portion 17, moving portions 18 that serve as a moving unit, a camera 19 that serves as an image capture unit, and a sensor 20 that serves as a detection unit.

The carrier portion 17 is to be loaded with a package such as a packing box. The carrier portion 17 is provided on top of the apparatus body portion 16.

The camera 19 captures an image of the surrounding area. In particular, the camera 19 captures an image of the feet of the target person to be followed 1. The camera 19 is provided on each of the front and rear surfaces of the apparatus body portion 16 to be directed in both travel directions of the apparatus.

The sensor 20 detects the distance to an object around the apparatus and the shape of the object. The sensor 20 is provided between the apparatus body portion 16 and the carrier portion 17. Examples of the sensor 20 include a laser range finder (laser distance sensor).

The moving portions 18 are provided under the apparatus body portion 16. The moving portions 18 move the apparatus so as to follow operation of the target person to be followed 1, which is detected by the camera 19 or the sensor 20. Examples of the moving portions 18 include wheels and legs. A drive source such as a motor, an actuator, an engine, or a hydraulic pump, for example, is connected to the wheels or the legs.

FIG. 3 is a block diagram illustrating the hardware configuration of the autonomous moving apparatus 10.

As illustrated in FIG. 3, the autonomous moving apparatus 10 includes a central processing unit (CPU) 21, a memory 22, a storage device 23, a wireless communication section 24, the moving portions 18, the camera 19, and the sensor 20, which are connected to each other via a control bus 25.

The CPU 21 executes a process determined in advance on the basis of a control program stored in the memory 22.

The storage device 23 stores the control program for controlling various portions of the autonomous moving apparatus 10.

The wireless communication section 24 transmits and receives data to and from the cellular phone communication network 14 via a wireless line.

FIG. 4 is a block diagram illustrating the functional configuration of the autonomous moving apparatus 10 which is implemented by executing the control program.

As illustrated in FIG. 4, the autonomous moving apparatus 10 according to the exemplary embodiment includes a control section 30, a detection section 32, a data transmission/reception section 33, the moving portions 18, and a data storage section 35.

The data transmission/reception section 33 transmits and receives data to and from the server 12 on the basis of control by the control section 30.

The detection section 32 detects the distance to an object around the apparatus and the shape of the object on the basis of control by the control section 30. In the present exemplary embodiment, the sensor 20 and the camera 19 are used as the detection section 32. However, the sensor 20 alone may be used as the detection section 32 to detect the distance to an object around the apparatus and the shape of the object, and the camera 19 may be used in combination with the sensor 20 in order to enhance the detection precision etc.

Specifically, the detection section 32 detects the feet of the target person to be followed 1, specifically each of the two feet of the target person to be followed 1. The detection section 32 detects the position of a first foot of the target person to be followed 1, which is stationary, and the position at which a second foot thereof, which is moving, has become stationary. The foot which is stationary means a foot that has landed on the ground surface and that serves as the axis when the target person to be followed walks or runs.

The detection section 32 also detects the moving distance of the second foot of the target person to be followed 1 with respect to the first foot thereof. In addition, the detection section 32 detects the stride length of the target person to be followed 1 in accordance with the difference between the position of the stationary first foot of the target person to be followed 1 and the position at which the moving second foot thereof has become stationary. That is, the stride length means the distance from the position at which the first foot lands to the position at which the second foot lands.

The moving portions 18 move the apparatus so as to follow operation of the target person to be followed 1, which is detected by the detection section 32, on the basis of control by the control section 30.

That is, the control section 30 performs control for movement by the moving portions 18 or stop in accordance with motion of each of the two feet of the target person to be followed 1, which is detected by the detection section 32.

Specifically, the control section 30 performs control for movement or stop in accordance with the relationship between the position of the stationary first foot of the target person to be followed 1 and the position at which the moving second foot thereof has become stationary, which is detected by the detection section 32.

For example, the control section 30 performs control for movement or stop in accordance with whether the position at which the moving second foot of the target person to be followed 1 has become stationary is closer to or farther from a position determined in advance with respect to the apparatus than the position of the stationary first foot of the target person to be followed 1, which is detected by the detection section 32.

Alternatively, the control section 30 performs control for movement or stop in accordance with whether or not the stride length, which is the difference between the position of the stationary first foot of the target person to be followed 1 and the position at which the moving second foot thereof has become stationary, which is detected by the detection section 32, is longer than a length determined in advance.

Alternatively, the control section 30 performs control for movement or stop in accordance with whether or not the moving distance of the second foot of the target person to be followed 1 with respect to the first foot thereof, which is detected by the detection section 32, is longer than a distance determined in advance.

In addition, after the stationary foot of the target person to be followed 1, which is detected by the detection section 32, is switched between right and left, the control section 30 performs control for movement or stop in accordance with the relationship between the position at which the first foot of the target person to be followed 1, which is moving, has become stationary and the position of the second foot thereof, which is stationary.

Alternatively, the control section 30 performs control for movement by the moving portions 18 or stop in accordance with specific motion, which is determined in advance, of the target person to be followed 1, which is detected by the detection section 32. The specific motion determined in advance is motion of a hand of the target person to be followed 1, for example, and the control section 30 performs control for movement or stop in accordance with motion to direct a palm of the target person to be followed 1 toward the apparatus, which is detected by the detection section 32.

The data storage section 35 stores various data on the basis of control by the control section 30. In addition, the data storage section 35 functions as a storage unit that learns and stores in advance operation of each of the two feet of the target person to be followed 1 for movement or stop. That is, the data storage section 35 stores, for each user, information on operation of each of the two feet of the user, such as the stride length, for movement or stop.

The data transmission/reception section 33 transmits and receives, to and from the server 12, information on operation of each of the two feet of the target person to be followed 1, such as the stride length, for movement or stop on the basis of control by the control section 30.

The control section 30 sets a threshold in advance in accordance with motion of each of the two feet of the target person to be followed 1, such as the stride length, which is stored in the data storage section 35, and performs control for such movement or stop as to follow the target person to be followed 1. The control section 30 also sets a threshold in advance in accordance with motion of each of the two feet of the target person to be followed 1, such as the stride length, which is received by the data transmission/reception section 33, and performs control for such movement or stop as to follow the target person to be followed 1.

FIGS. 5A and 5B to 16A to 16C illustrate an example of operation of the autonomous moving apparatus 10.

Figure 5A:
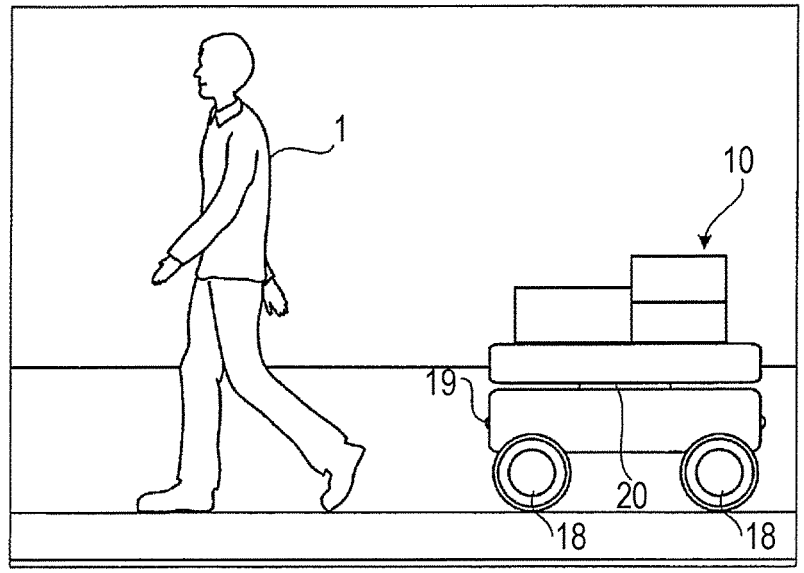
FIG. 5A illustrates an example of operation of the autonomous moving apparatus according to the exemplary embodiment of the present disclosure in a following mode.
Figure 5B:
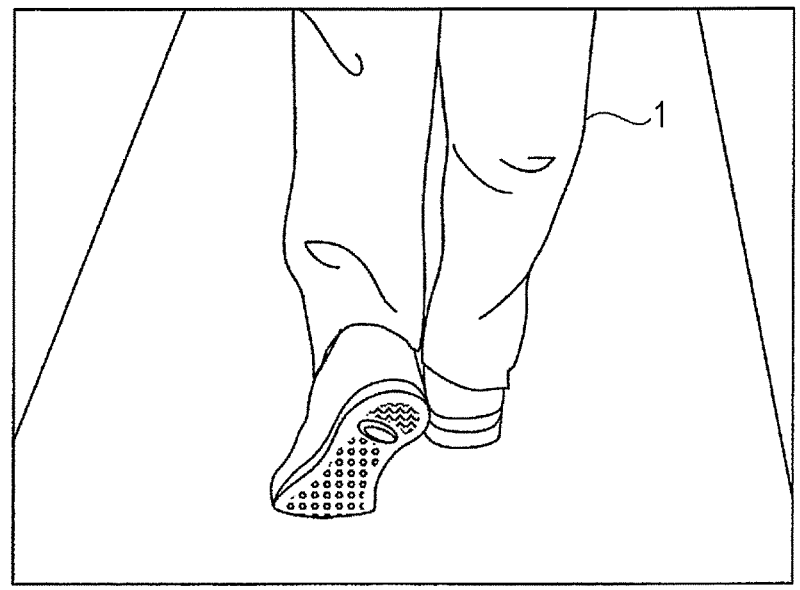
FIG. 5B illustrates an example of an image captured by a camera of the autonomous moving apparatus illustrated in FIG. 5A.
Figure 6:
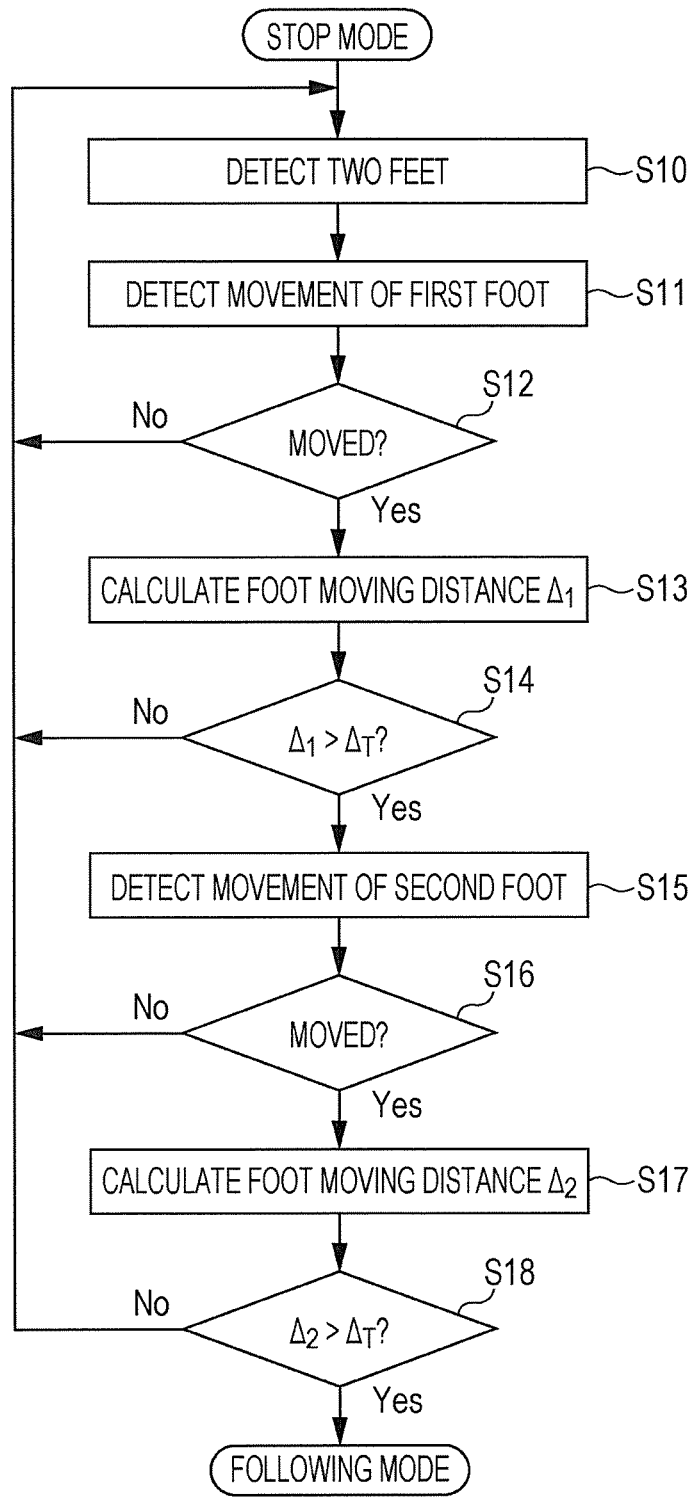
FIG. 6 is a flowchart illustrating a control flow of the autonomous moving apparatus according to the exemplary embodiment of the present disclosure, from the stop in a stop mode to the start of movement in the following mode.
Figure 8:
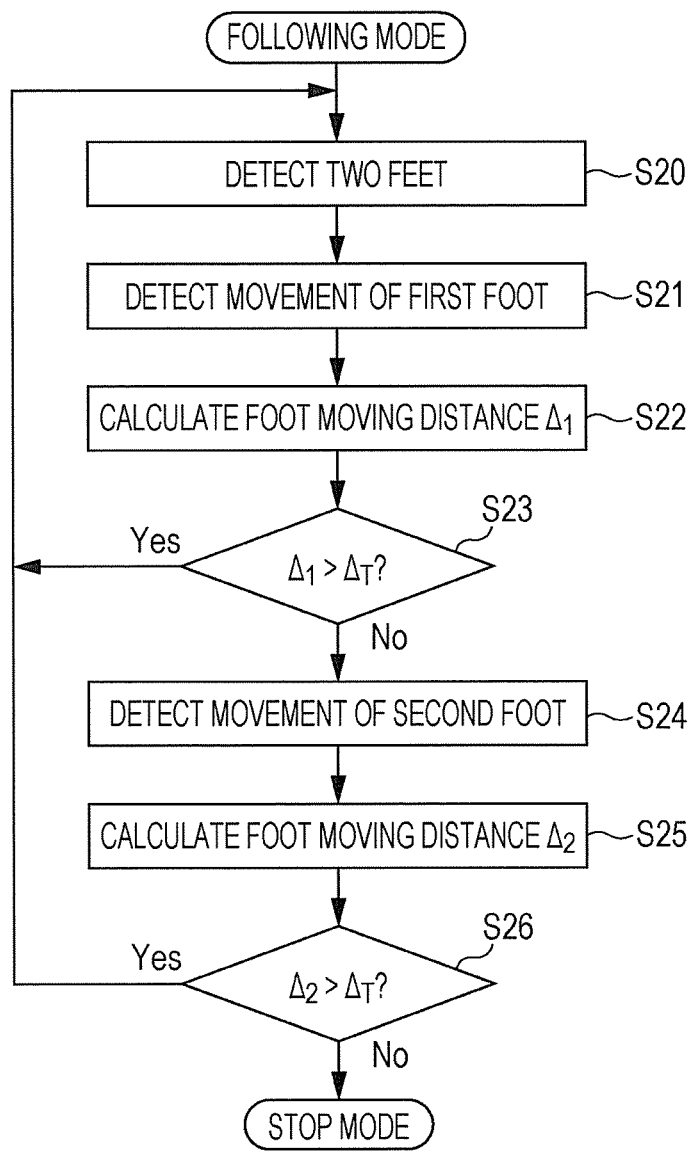
FIG. 8 is a flowchart illustrating a control flow of the autonomous moving apparatus according to the exemplary embodiment of the present disclosure, from the middle of movement in the following mode to the stop in the stop mode.

FIG. 5A illustrates an example of operation of the autonomous moving apparatus 10 in the following mode. FIG. 5B illustrates an example of an image captured by the camera 19 of the autonomous moving apparatus 10.

As illustrated in FIG. 5A, the autonomous moving apparatus 10 moves or stops so as to follow the target person to be followed 1. That is, as illustrated in FIG. 5B, the autonomous moving apparatus 10 captures an image of the feet of the target person to be followed 1 using the camera 19, and detects motion of each of the two feet of the target person to be followed 1 using the camera 19 and the sensor 20. The autonomous moving apparatus 10 moves or stops so as to follow the target person to be followed 1 by moving when the target person to be followed 1 moves and stopping when the target person to be followed 1 stops so as to hold the distance to the target person to be followed 1 (a distance d set in advance).

Next, operation of the autonomous moving apparatus 10 from the stop in the stop mode to the start of movement in the following mode will be described with reference to FIGS. 6 and 7A to 7C.

First, the two feet of the target person to be followed 1 are detected by the camera 19 and the sensor 20 (FIG. 7A; step S10).

Movement of the first foot is detected (step S11). When movement of the first foot is detected (Yes in step S12), a foot moving distance $\Delta_1$ between the position of the first foot of the target person to be followed 1, which is stationary, and the position at which the second foot thereof, which is moving, has become stationary is calculated (FIG. 7B; step S13).

In the case where the foot moving distance $\Delta_1$ is more than a threshold $\Delta_T$ (Yes in step S14), movement of the second foot is detected (step S15).

The threshold $\Delta_T$ differs among users, and corresponds to one-third of the average moving distance between feet during normal walk, for example. At the start of movement, the threshold $\Delta_T$ is determined as one-third of the average moving distance between feet during normal walk of an adult person, e.g. 10 cm. Learning is performed while moving so as to follow the target person to be followed 1.

Specifically, the autonomous moving apparatus 10 calculates the foot moving distance by detecting movement of each of the two feet of the target person to be followed 1 while moving, accumulates information, calculates the average foot moving distance, and sets one-third of the average foot moving distance as the threshold $\Delta_T$ for the target person to be followed 1. In the case where the threshold $\Delta_T$ for the target person to be followed 1 is stored in the data storage section 35 or a storage section of the server 12, the stored threshold $\Delta_T$ may alternatively be used.

When movement of the second foot is detected (Yes in step S16), a foot moving distance $\Delta_2$ between the position of the stationary first foot of the target person to be followed 1 and the position at which the moving second foot thereof has become stationary is calculated (FIG. 7C; step S17).

In the case where the foot moving distance $\Delta_2$ is more than the threshold $\Delta_T$ (Yes in step S18), movement in the following mode is started.

That is, the control section 30 performs control for movement in the following mode in the case where the foot moving distance ($\Delta_1$, $\Delta_2$) between the position of the first feet of the target person to be followed 1, which is stationary, and the position at which the second foot thereof, which is moving, has become stationary, which is detected by the detection section 32, is more than the threshold $\Delta_T$. The foot moving distance $\Delta_1$, $\Delta_2$ is not limited to being determined when the moving foot has become stationary (has landed), and movement in the following mode may be started in the case where the foot moving distance $\Delta_1$, $\Delta_2$ exceeds the threshold $\Delta_T$.

Alternatively, the control section 30 may perform control for movement in the following mode in the case where the position at which the moving second foot of the target person to be followed 1 has become stationary is farther from a position determined in advance with respect to the apparatus than the position of the stationary first foot of the target person to be followed 1, which is detected by the detection section 32.

Next, operation of the autonomous moving apparatus 10 from the middle of movement in the following mode to the stop in the stop mode will be described with reference to FIGS. 8 and 9A to 9C.

First, the two feet of the target person to be followed 1 are detected by the camera 19 and the sensor 20 (FIG. 9A; step S20).

Movement of the first foot is detected (step S21). The foot moving distance $\Delta_1$ between the position of the first leg of the target person to be followed 1, which is stationary, and the position at which the second leg thereof, which is moving, has become stationary is calculated (FIG. 9B; step S22).

In the case where the foot moving distance $\Delta_1$ is less than the threshold $\Delta_T$ (No in step S23), movement of the second foot is detected (step S24).

When movement of the second foot is detected (step S24), the foot moving distance $\Delta_2$ between the position of the stationary first foot of the target person to be followed 1 and the position at which the moving second foot thereof has become stationary is calculated (FIG. 9C; step S25).

In the case where the foot moving distance $\Delta_2$ is less than the threshold $\Delta_T$ (No in step S26), the autonomous moving apparatus 10 is decelerated to be stopped (stop mode).

That is, the control section 30 performs control for stop in the case where the foot moving distance ($\Delta_1$, $\Delta_2$) between the position of the first feet of the target person to be followed 1, which is stationary, and the position at which the second foot thereof, which is moving, has become stationary, which is detected by the detection section 32, is less than the threshold $\Delta_T$.

The control section 30 may perform control for stop in the case where the position at which the moving second foot of the target person to be followed 1 has become stationary is closer to a position determined in advance with respect to the apparatus than the position of the stationary first foot of the target person to be followed 1, which is detected by the detection section 32.

Figure 10:
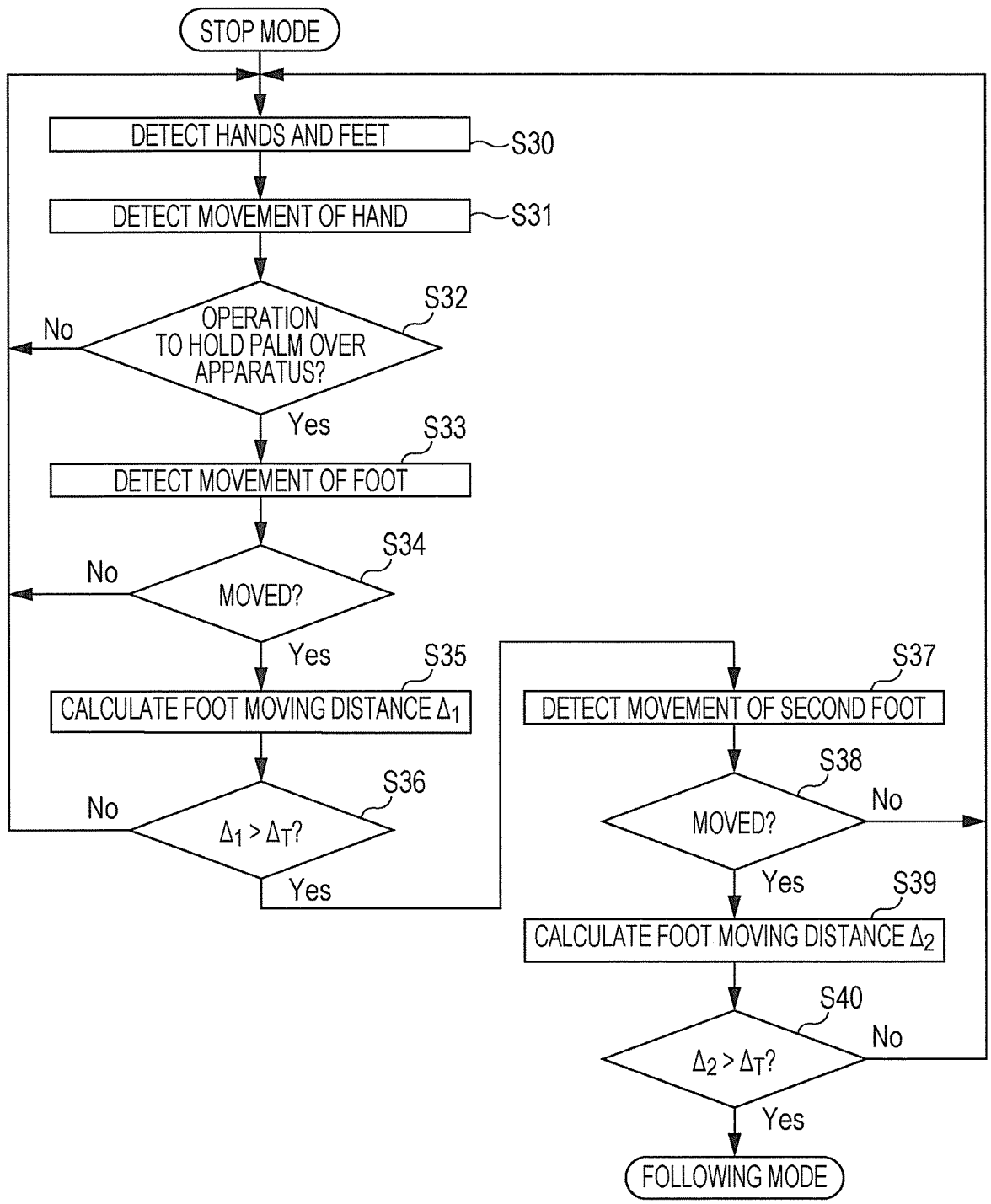
FIG. 10 is a flowchart illustrating a modification of the control flow of operation of the autonomous moving apparatus according to the exemplary embodiment of the present disclosure.

FIG. 10 is a flowchart illustrating a modification of the control flow of operation of the autonomous moving apparatus 10.

In the present modification, the camera 19 and the sensor 20 detect hands and feet while the autonomous moving apparatus 10 is stationary (step S30). Movement of a hand is detected (step S31). In the case where operation to hold a palm over the apparatus is detected (Yes in step S32), the control section 30 recognizes that a person who has performed the operation to hold a palm over the apparatus is the target person to be followed 1, and detects movement of the feet of the target person to be followed 1 using the detection section 32 (step S33). When movement of a foot is detected (Yes in step S34), a foot moving distance $\Delta_1$ between the position of the first foot of the target person to be followed 1, which is stationary, and the position at which the second foot thereof, which is moving, has become stationary is calculated (step S35).

In the case where the foot moving distance $\Delta_1$ is less than the threshold $\Delta_T$ (No in step S36), the process returns to the operation in step S30 to continue the stop mode. In the case where the foot moving distance $\Delta_1$ is more than the threshold $\Delta_T$ (Yes in step S36), movement of the second foot is detected (step S37).

When movement of the second foot is detected (Yes in step S38), the foot moving distance $\Delta_2$ between the position of the stationary first foot of the target person to be followed 1 and the position at which the moving second foot thereof has become stationary is calculated (step S39).

In the case where the foot moving distance $\Delta_2$ is more than the threshold $\Delta_T$ (Yes in step S40), movement in the following mode is started. In the case where the foot moving distance $\Delta_2$ is less than the threshold $\Delta_T$ (No in step S40), the process returns to the operation in step S30 to continue the stop mode.

Figure 11:
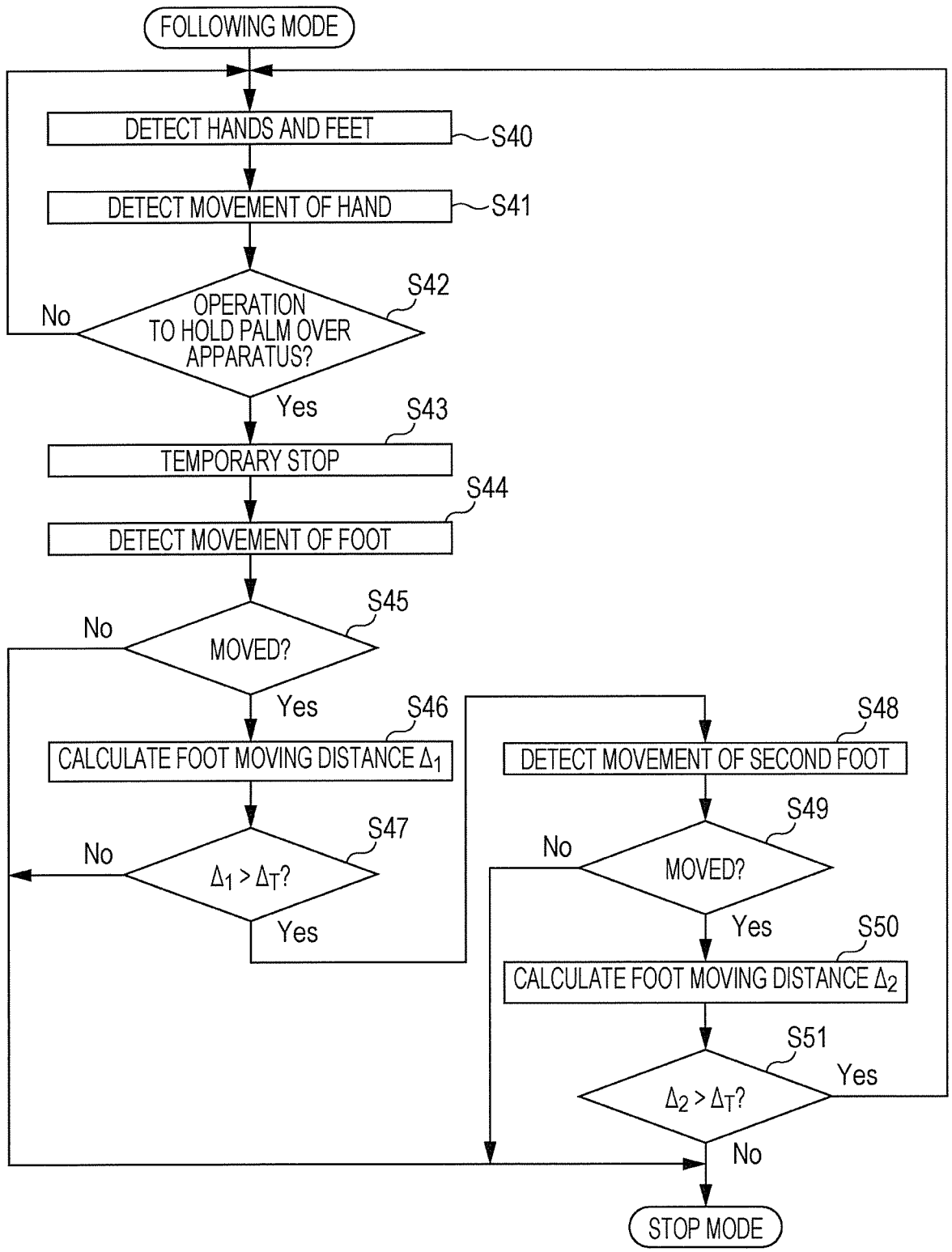
FIG. 11 is a flowchart illustrating a modification of the control flow of operation of the autonomous moving apparatus according to the exemplary embodiment of the present disclosure.

FIG. 11 is a flowchart illustrating another modification of the control flow of operation of the autonomous moving apparatus 10.

In the present modification, the camera 19 and the sensor 20 detect the hands and the feet of the target person to be followed 1 while moving in the following mode (step S40). Movement of a hand of the target person to be followed 1 is detected (step S41). In the case where operation to hold a palm over the autonomous moving apparatus 10 is detected (step S42), the control section 30 performs control so as to switch movement by the moving portions 18 to the stop mode to temporarily stop the movement (step S43). That is, there is no need for the target person to be followed 1 to perform an operation to push a stop button in the case where a package is loaded to and unloaded from the carrier portion 17 etc. The camera 19 and the sensor 20 detect movement of the feet (step S44). When movement of a foot is detected (step S45), the foot moving distance $\Delta_1$ between the position of the first foot of the target person to be followed 1, which is stationary, and the position at which the second foot thereof, which is moving, has become stationary is calculated (step S46).

In the case where the foot moving distance $\Delta_1$ is less than the threshold $\Delta_T$ (No in step S47), the stop mode is continued. In the case where the foot moving distance $\Delta_1$ is more than the threshold $\Delta_T$ (Yes in step S47), movement of the second foot is detected (step S48).

When movement of the second foot is detected (step S49), the foot moving distance $\Delta_2$ between the position of the stationary first foot of the target person to be followed 1 and the position at which the moving second foot thereof has become stationary is calculated (step S50).

In the case where the foot moving distance $\Delta_2$ is more than the threshold $\Delta_T$ (Yes in step S51), the process returns to the operation in step S40 to resume the movement in the following mode. In the case where the foot moving distance $\Delta_2$ is less than the threshold $\Delta_T$ (No in step S51), the stop mode is continued.

Figure 12A:
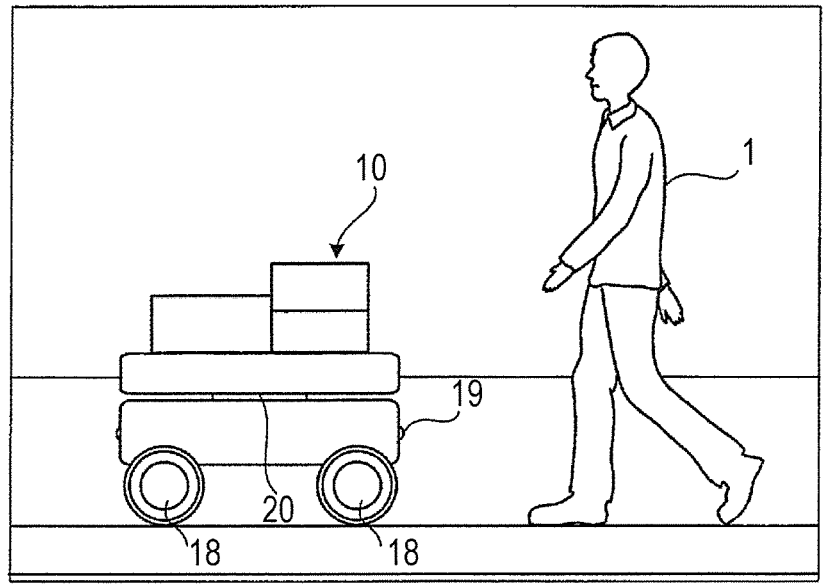
FIG. 12A illustrates an example of operation of the autonomous moving apparatus according to the exemplary embodiment of the present disclosure in a leading mode.
Figure 12B:
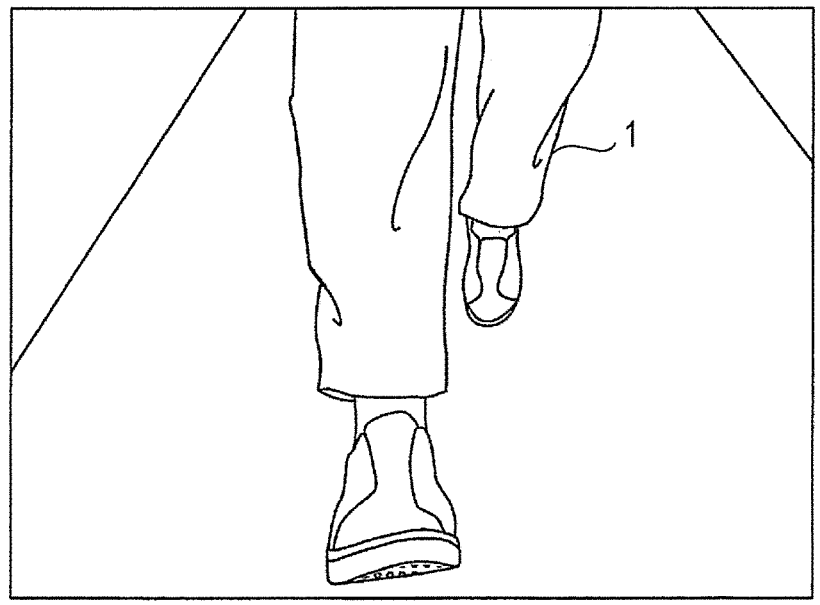
FIG. 12B illustrates an example of an image captured by a camera of the autonomous moving apparatus illustrated in FIG. 12A.
Figure 13:
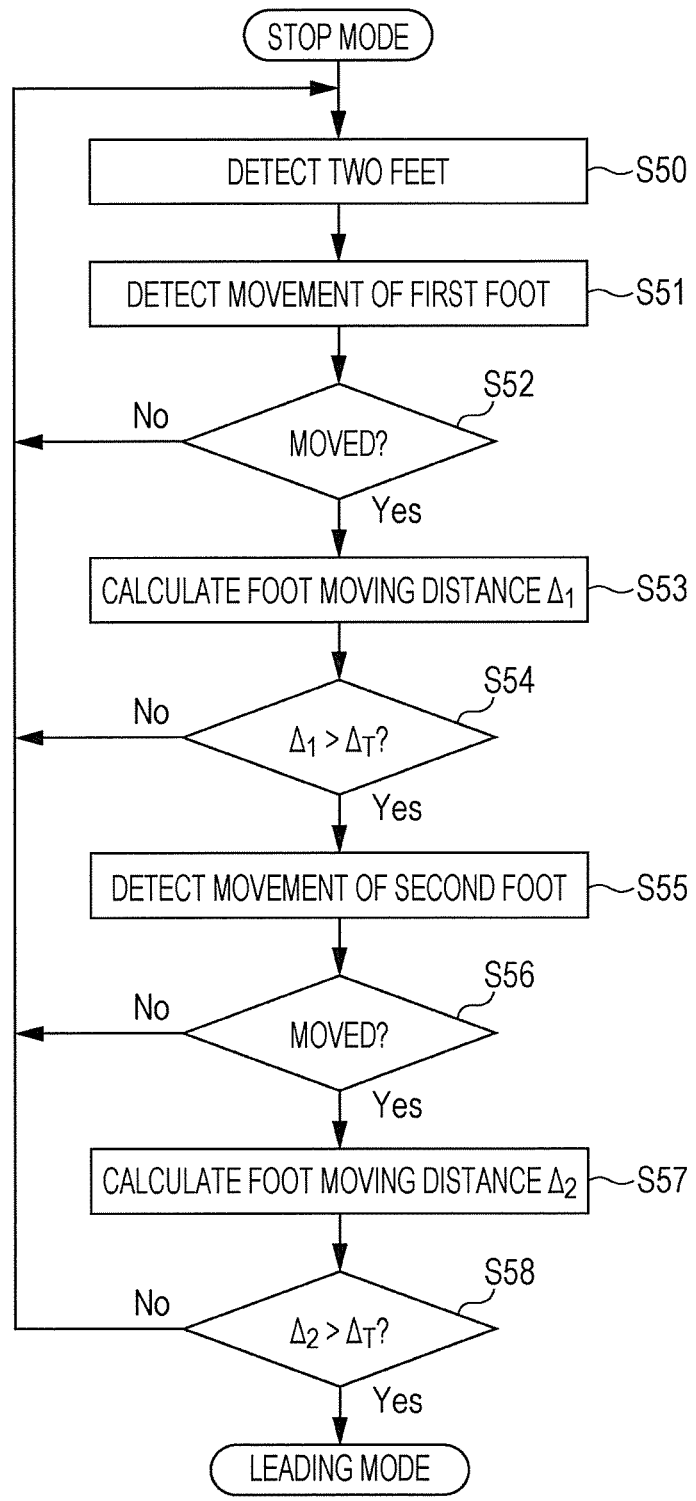
FIG. 13 is a flowchart illustrating a control flow of the autonomous moving apparatus according to the exemplary embodiment of the present disclosure, from the stop in the stop mode to the start of movement in the leading mode.
Figure 15:
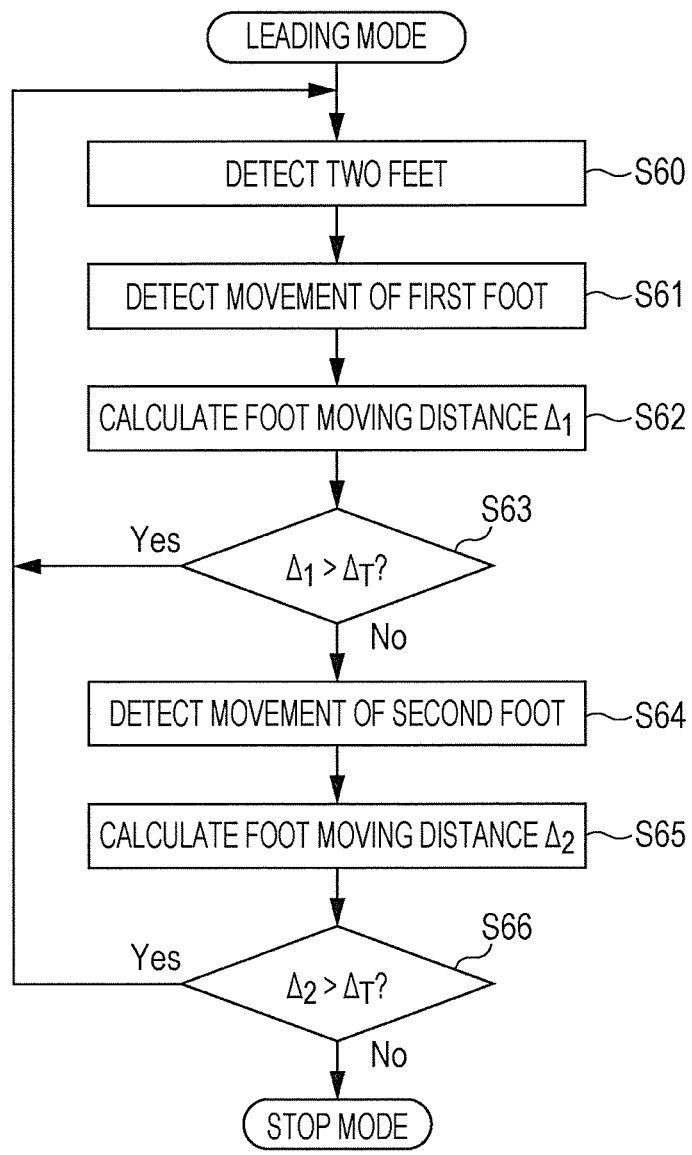
FIG. 15 is a flowchart illustrating a control flow of the autonomous moving apparatus according to the exemplary embodiment of the present disclosure, from the middle of movement in the leading mode to the stop in the stop mode.

FIG. 12A illustrates an example of operation of the autonomous moving apparatus 10 in the leading mode. FIG. 12B illustrates an example of an image captured by the camera 19 of the autonomous moving apparatus 10.

As illustrated in FIG. 12A, the autonomous moving apparatus 10 moves or stops so as to lead the target person to be followed 1. That is, as illustrated in FIG. 12B, the autonomous moving apparatus 10 captures an image of the feet of the target person to be followed 1 using the camera 19, and detects motion of each of the two feet of the target person to be followed 1 using the camera 19 and the sensor 20. The autonomous moving apparatus 10 moves or stops so as to lead the target person to be followed 1 by moving when the target person to be followed 1 moves and stopping when the target person to be followed 1 stops so as to hold the distance to the target person to be followed 1 (a distance d set in advance).

Next, operation of the autonomous moving apparatus 10 from the stop in the stop mode to the start of movement in the leading mode will be described with reference to FIGS. 13 and 14A to 14C.

First, the two feet of the target person to be followed 1 are detected by the camera 19 and the sensor 20 (FIG. 14A; step S50).

Movement of the first foot is detected (step S51). When movement of the first foot is detected (Yes in step S52), the foot moving distance $\Delta_1$ between the position of the first foot of the target person to be followed 1, which is stationary, and the position at which the second foot thereof, which is moving, has become stationary is calculated (FIG. 14B; step S53).

In the case where the foot moving distance $\Delta_1$ is more than the threshold $\Delta_T$ (Yes in step S54), movement of the second foot is detected (step S55).

When movement of the second foot is detected (Yes in step S56), the foot moving distance $\Delta_2$ between the position of the stationary first foot of the target person to be followed 1 and the position at which the moving second foot thereof has become stationary is calculated (FIG. 14C; step S57).

In the case where the foot moving distance $\Delta_2$ is more than the threshold $\Delta_T$ (Yes in step S58), movement in the leading mode is started.

That is, the control section 30 performs control for movement in the leading mode in the case where the foot moving distance ($\Delta_1$, $\Delta_2$) between the position of the first feet of the target person to be followed 1, which is stationary, and the position at which the second foot thereof, which is moving, has become stationary, which is detected by the detection section 32, is more than the threshold $\Delta_T$. The foot moving distance $\Delta_1$, $\Delta_2$ is not limited to being determined when the moving foot has become stationary (has landed), and movement in the leading mode may be started in the case where the foot moving distance $\Delta_1$, $\Delta_2$ exceeds the threshold $\Delta_T$.

Alternatively, the control section 30 may perform control for movement in the leading mode in the case where the position at which the moving second foot of the target person to be followed 1 has become stationary is closer to a position determined in advance with respect to the apparatus than the position of the stationary first foot of the target person to be followed 1, which is detected by the detection section 32.

Next, operation of the autonomous moving apparatus 10 from the middle of movement in the leading mode to the stop in the stop mode will be described with reference to FIGS. 15 and 16A to 16C.

Figure 16C:
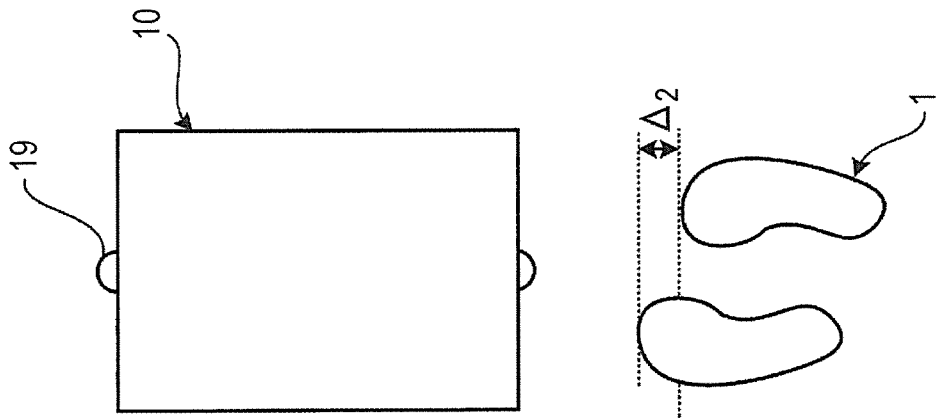
FIGS. 16A to 16C illustrate operation of the autonomous moving apparatus from the middle of movement in the leading mode to the stop in the stop mode illustrated in FIG. 15.
Figure 16B:
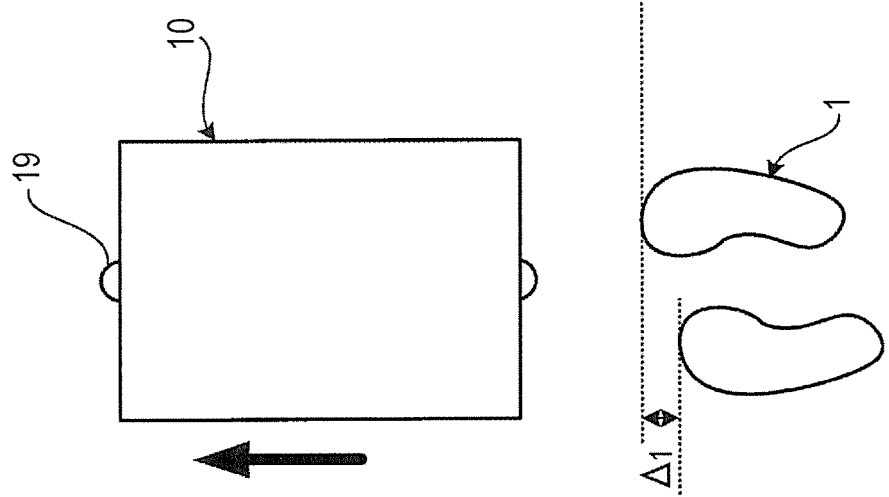
Figure 16A:
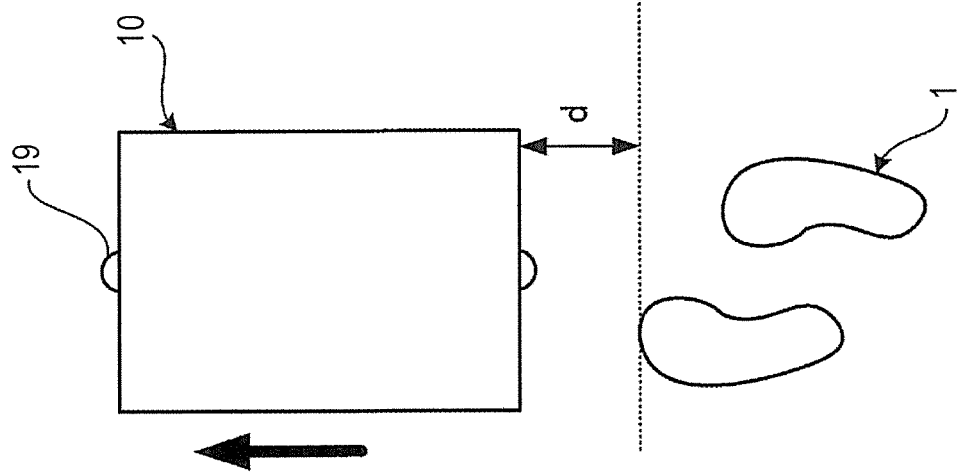

First, the two feet of the target person to be followed 1 are detected by the camera 19 and the sensor 20 (FIG. 16A; step S60).

Movement of the first foot is detected (step S61). The foot moving distance $\Delta_1$ between the position of the first leg of the target person to be followed 1, which is stationary, and the position at which the second leg thereof, which is moving, has become stationary is calculated (FIG. 16B; step S62).

In the case where the foot moving distance $\Delta_1$ is less than the threshold $\Delta_T$ (No in step S63), movement of the second foot is detected (step S64).

When movement of the second foot is detected (step S64), the foot moving distance $\Delta_2$ between the position of the stationary first foot of the target person to be followed 1 and the position at which the moving second foot thereof has become stationary is calculated (FIG. 16C; step S65).

In the case where the foot moving distance $\Delta_2$ is less than the threshold $\Delta_T$ (No in step S66), the autonomous moving apparatus 10 is decelerated to be stopped (stop mode).

That is, the control section 30 performs control for stop in the case where the foot moving distance ($\Delta_1$, $\Delta_2$) between the position of the first feet of the target person to be followed 1, which is stationary, and the position at which the second foot thereof, which is moving, has become stationary, which is detected by the detection section 32, is less than the threshold $\Delta_T$.

The control section 30 may perform control for stop in the case where the position at which the moving second foot of the target person to be followed 1 has become stationary is farther from a position determined in advance with respect to the apparatus than the position of the stationary first foot of the target person to be followed 1, which is detected by the detection section 32.

That is, the control section 30 performs control for movement in the following mode or the leading mode by the moving portions 18 or stop in the stop mode in accordance with motion of each of the two feet of the target person to be followed 1, which is detected by the detection section 32, and performs control for movement in the following mode or the leading mode or stop in the stop mode in accordance with the relationship between the position of the first foot of the target person to be followed 1, which is stationary, and the position at which the second foot thereof, which is moving, has become stationary, which is detected by the detection section 32.

Control for movement or stop may be performed by switching from the following mode to the leading mode, without the target person to be followed 1 performing an operation, with the autonomous moving apparatus 10 stopped in the stop mode while moving in the following mode illustrated in FIGS. 8 and 9A to 9C and thereafter the autonomous moving apparatus 10 starting movement in the leading mode illustrated in FIGS. 13 and 14A to 14C when the target person to be followed 1 turns to face the apparatus. In the same manner, in addition, control for movement or stop may be performed by switching from the leading mode to the following mode.

In the exemplary embodiment described above, after the stationary foot of the target person to be followed 1, which is detected by the detection section 32, is switched between right and left, the control section 30 performs control for movement or stop in accordance with the relationship between the position at which the first foot of the target person to be followed 1, which is moving, has become stationary and the position of the second foot thereof, which is stationary. However, the present disclosure is not limited thereto. The control section 30 may perform control for movement or stop in accordance with the position at which the first foot of the target person to be followed 1, which is moving, has become stationary and the position of the second foot thereof, which is stationary.

The present disclosure is not limited to the exemplary embodiment described above, and may be modified in various ways without departing from the scope and spirit of the present disclosure. For example, in the exemplary embodiment described above, the autonomous moving apparatus 10 moves with a package such as a packing box loaded thereon. However, the present disclosure is not limited thereto, and may be applied to an apparatus that is autonomously movable so as to follow a person.

What is claimed is:

1. An autonomous moving apparatus comprising:
   a sensor that detects a distance to an object around the apparatus and a shape of the object;
   a wheel that moves the apparatus so as to follow operation of a target person to be followed, which is detected by the sensor; and
   a control unit that performs control for movement by the wheel or stop in accordance with motion of each of two feet of the target person to be followed, which is detected by the sensor,
   wherein the control unit performs control for movement or stop in accordance with a relationship between a position of a first foot of the target person to be followed, which is stationary, and a position at which a second foot thereof, which is moving, has become stationary, which is detected by the sensor.

2. The autonomous moving apparatus according to claim 1,
   wherein the control unit performs control for movement or stop in accordance with whether the position at which the moving second foot of the target person to be followed has become stationary is closer to or farther from a position determined in advance with respect to the apparatus than the position of the stationary first foot of the target person to be followed, which is detected by the sensor.

3. The autonomous moving apparatus according to claim 1,
   wherein the control unit performs control for movement or stop in accordance with whether or not a difference between the position of the stationary first foot of the target person to be followed and the position at which the moving second foot thereof has become stationary, which is detected by the sensor, is longer than a length determined in advance.

4. The autonomous moving apparatus according to claim 1,
   wherein the control unit performs control for movement or stop in accordance with whether or not a moving distance of a second foot of the target person to be followed with respect to a first foot thereof, which is detected by the sensor, is longer than a distance determined in advance.

5. The autonomous moving apparatus according to claim 1,
   wherein the sensor detects a stride length of the target person to be followed, and the control unit performs control for movement or stop in accordance with whether or not the stride length of the target person to be followed, which is detected by the sensor, is longer than a length determined in advance.

6. The autonomous moving apparatus according to claim 1,
   wherein, after the stationary foot of the target person to be followed, which is detected by the sensor, is switched between right and left, the control unit performs control for movement or stop in accordance with a relationship between a position at which the first foot of the target person to be followed, which is moving, has become stationary and a position of the second foot thereof, which is stationary.

7. The autonomous moving apparatus according to claim 1,
   wherein the control unit performs control for movement by the wheel or stop in accordance with specific motion, which is determined in advance, of the target person to be followed, which is detected by the sensor.

8. The autonomous moving apparatus according to claim 7,
   wherein the specific motion determined in advance is motion of a hand of the target person to be followed.

9. The autonomous moving apparatus according to claim 8,
   wherein the control unit performs control for movement or stop in accordance with motion to direct a palm of the target person to be followed toward the apparatus, which is detected by the sensor.

10. The autonomous moving apparatus according to claim 1, further comprising
    a storage unit that learns and stores in advance operation of each of the two feet of the target person to be followed for movement or stop,
    wherein the control unit that performs control for movement or stop in accordance with the operation of each of the two feet of the target person to be followed, which is stored in the storage unit.

11. A non-transitory computer readable medium storing a program causing a computer to execute a process comprising:
    detecting a distance to an object around an apparatus and a shape of the object;
    moving the apparatus so as to follow operation of a target person to be followed, which is detected;
    performing control for movement or stop in accordance with motion of each of two feet of the target person to be followed, which is detected; and
    performing control for movement or stop in accordance with a relationship between a position of a first foot of the target person to be followed, which is stationary, and a position at which a second foot thereof, which is moving, has become stationary.

* * * * *